(12) United States Patent
Pal et al.

(10) Patent No.: US 10,707,683 B2
(45) Date of Patent: Jul. 7, 2020

(54) DIRECTING OR MODULATING ELECTRICAL POWER DRAWN BY ONE OR MORE LOADS FROM A SOLAR PHOTOVOLTAIC MODULE ARRAY WHILE MAINTAINING A BUFFER MARGIN

(71) Applicant: TOKITAE LLC, Bellevue, WA (US)

(72) Inventors: Brian L. Pal, Medina, WA (US); Roderick T. Hinman, Bellevue, WA (US); Shieng Liu, Bellevue, WA (US); Jennifer Ezu Hu, Seattle, WA (US); Fridrik Larusson, Seattle, WA (US); Fong-Li Chou, Bellevue, WA (US); Nels R. Peterson, Bellevue, WA (US); Lowell L. Wood, Jr., Bellevue, WA (US)

(73) Assignee: TOKITAE LLC, Bellevue, WA (US)

( * ) Notice: Subject to any disclaimer, the term of this patent is extended or adjusted under 35 U.S.C. 154(b) by 0 days.

(21) Appl. No.: 15/715,491

(22) Filed: Sep. 26, 2017

(65) Prior Publication Data
US 2018/0090939 A1 Mar. 29, 2018

Related U.S. Application Data

(60) Provisional application No. 62/401,357, filed on Sep. 29, 2016.

(51) Int. Cl.
*G05D 3/00* (2006.01)
*H02J 3/38* (2006.01)
(Continued)

(52) U.S. Cl.
CPC .............. *H02J 3/383* (2013.01); *F25B 49/00* (2013.01); *G05F 1/67* (2013.01); *G06Q 50/06* (2013.01); *H02J 1/14* (2013.01); *H02J 3/14* (2013.01); *H02S 40/38* (2014.12); *H02S 50/00* (2013.01); *H02S 50/10* (2014.12); *G05B 19/041* (2013.01); *H02J 7/35* (2013.01); *Y02E 10/566* (2013.01); *Y02E 10/58* (2013.01)

(58) Field of Classification Search
CPC ...................................................... H02J 3/382
USPC ......................................................... 700/297
See application file for complete search history.

(56) References Cited

U.S. PATENT DOCUMENTS 4,728,901 A * 3/1988 Pepper .................... H03F 3/505
323/273
7,831,843 B2 * 11/2010 Brundridge ........... G06F 1/3203
713/300

(Continued)

OTHER PUBLICATIONS

U.S. Appl. No. 62/401,357 filed Sep. 29, 2016.

(Continued)

*Primary Examiner* — Suresh Suryawanshi
(74) *Attorney, Agent, or Firm* — Dorsey & Whitney LLP

(57) ABSTRACT

Generally, this disclosure relates to methods of prioritizing or directing available power to a main device, such as a temperature-stabilized and/or temperature-controlled storage container. In an embodiment, the method may include measuring electrical power available from a solar photovoltaic module array that is electrically coupled to the main device, and modulating the electrical power drawn by the main device based on the available electrical power. Available power unused by the main device may be diverted to one or more secondary devices.

32 Claims, 9 Drawing Sheets

(51) Int. Cl.
*H02S 50/10* (2014.01)
*H02J 1/14* (2006.01)
*G06Q 50/06* (2012.01)
*H02S 40/38* (2014.01)
*F25B 49/00* (2006.01)
*G05F 1/67* (2006.01)
*H02J 3/14* (2006.01)
*H02S 50/00* (2014.01)
*H02J 7/35* (2006.01)
*G05B 19/04* (2006.01)

(56) References Cited

U.S. PATENT DOCUMENTS

| | | | | |
|---|---|---|---|---|
| 8,332,666 | B2* | 12/2012 | Boss | H02J 3/14 713/300 |
| 8,359,125 | B2* | 1/2013 | Park | H02J 3/14 700/22 |
| 8,631,908 | B2* | 1/2014 | Schroeder-Brumloop | B66B 5/027 187/290 |
| 8,935,011 | B2* | 1/2015 | Tischer | H02J 3/14 700/295 |
| 9,350,170 | B2* | 5/2016 | Walley | H02J 1/14 |
| 9,366,483 | B2 | 6/2016 | Eckhoff et al. | |
| 9,435,578 | B2 | 9/2016 | Calderon et al. | |
| 9,523,522 | B2 | 12/2016 | Chou et al. | |
| 9,726,418 | B2 | 8/2017 | Chou et al. | |
| 9,735,703 | B2* | 8/2017 | Dent | H02M 7/537 |
| 2010/0269383 | A1* | 10/2010 | Nifenecker | H05B 33/0803 40/541 |
| 2011/0313585 | A1 | 12/2011 | Park | |
| 2012/0254633 | A1* | 10/2012 | Vilhauer | G06F 1/3212 713/300 |
| 2013/0035802 | A1 | 2/2013 | Khaitan et al. | |
| 2014/0049053 | A1 | 2/2014 | Inoue | |
| 2014/0060100 | A1 | 3/2014 | Bryson | |
| 2014/0088780 | A1* | 3/2014 | Chen | G05F 1/66 700/295 |
| 2014/0248802 | A1* | 9/2014 | Hieda | H04L 12/2818 439/620.01 |
| 2015/0074441 | A1* | 3/2015 | Sako | H02J 3/14 713/330 |
| 2015/0214768 | A1* | 7/2015 | Matsuyama | G06Q 50/06 700/296 |
| 2016/0111908 | A1* | 4/2016 | Kwark | H02J 7/0054 320/103 |
| 2017/0025876 | A1* | 1/2017 | Chan | H02J 7/345 |
| 2018/0082224 | A1* | 3/2018 | Leslie | G06F 9/4893 |

OTHER PUBLICATIONS

European Patent Office; Extended European Search Report; Pursuant to Rule 62 EPC; App. No. PE 17857436.4; dated Mar. 2, 2020 (recieved by our Agent on Feb. 26, 2020); pp. 1-8.

* cited by examiner

DIRECTING OR MODULATING ELECTRICAL POWER DRAWN BY ONE OR MORE LOADS FROM A SOLAR PHOTOVOLTAIC MODULE ARRAY WHILE MAINTAINING A BUFFER MARGIN

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

Priority Applications

U.S. Provisional Application No. 62/401,357, entitled "Devices for Use with Refrigeration Devices Including Temperature-Controlled Container Systems," filed Sep. 29, 2016.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

BACKGROUND

Temperature-controlled devices and systems can maintain internal storage region(s) at a suitable temperature for various products that may be sensitive to temperature. For example, temperature-sensitive products may degrade or fail if the temperature thereof increases above an upper threshold temperature or falls below a lower threshold temperature. Some medicines, such as vaccines, may become unusable if held at, above, or below a certain temperature for a certain period of time. Some temperature-controlled devices and systems are electrically powered. In some examples, electrical power to the temperature-controlled devices and systems may be intermittent, inconsistent, or variable, such as in rural areas or when the temperature-controlled devices and systems are connected directly to a solar photovoltaic module array.

Accordingly, manufacturers and users of temperature-controlled devices and systems continue to seek improvements thereto.

SUMMARY

Generally, embodiments of the present disclosure relates to devices and methods for use with refrigeration devices including temperature-stabilized or temperature-controlled storage containers. In one or more embodiments, various methods to prioritize or direct electrical power to various devices are disclosed. As described in detail below, information or data is obtained regarding the available power from a power source, such as a solar photovoltaic module array. Using such information or data, the available power from the solar photovoltaic module array is quantified and prioritized to attached equipment in real time. For example, in situations where available electrical power is insufficient to power a plurality of devices, the present disclosure provides various methods to "harvest" available power with increased efficiency. More specifically, available electrical power may be prioritized for use by a main device, such as a refrigeration device to cool and/or maintain a selected or suitable temperature range therein. Available power unused by the main device, if any, may be diverted to other devices to "harvest" the available power. The refrigeration device can include a temperature control system operable to control the temperature in an interior space of the refrigeration device. For example, the temperature control system can cool the interior space of the refrigeration device to a suitable or selected temperature or temperature range and maintain the selected or suitable temperature therein. More specifically, in some embodiments, the temperature control system may freeze a thermal battery, which in turn cools the interior space of the refrigeration device via a heat transfer system therebetween. As such, the temperature-controlled storage container may maintain suitable temperature of temperature-sensitive items stored therein (e.g., medicine, vaccines, food, etc.).

An embodiment includes a method of directing electrical power to one or more devices. The method includes continuously measuring electrical power available from a solar photovoltaic module array that is electrically coupled to a main device, and modulating the electrical power drawn by the main device based on the available electrical power.

An embodiment includes a method of prioritizing power between a plurality of devices. The method includes comparing power available from a power source to the power needs of a main device and one or more secondary devices, directing available power to the main device, and diverting unused available power to the one or more secondary devices. The power source includes a solar photovoltaic module array electrically coupled to the main device.

An embodiment includes a control assembly configured to modulate electrical power drawn by one or more devices based on available power. The control assembly includes a monitoring module configured to continuously measure electrical power available from a power source, and a control module configured to selectively direct electrical power to the one or more devices based on the available power. The control module selects which loads to turn on based on the power requirements of the one or more devices in relation to the available power.

An embodiment includes a refrigeration device assembly. The refrigeration device assembly includes a solar photovoltaic module array, a refrigeration device electrically coupled to the solar photovoltaic module array, a monitoring module configured to continuously measure electrical power available from the solar photovoltaic module array, and a control module configured to modulate electrical power drawn by one or more loads from the solar photovoltaic module array based on available power. The control module selects which loads to turn on based on the power requirements of the one or more loads in relation to the available power.

Features from any of the disclosed embodiments may be used in combination with one another, without limitation. In addition, other features and advantages of the present disclosure will become apparent to those of ordinary skill in the art through consideration of the following detailed description and the accompanying drawings.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 4 illustrates an example plot of voltage and current at a power source as individual test load combinations are turned on;

DETAILED DESCRIPTION

Figure 1:
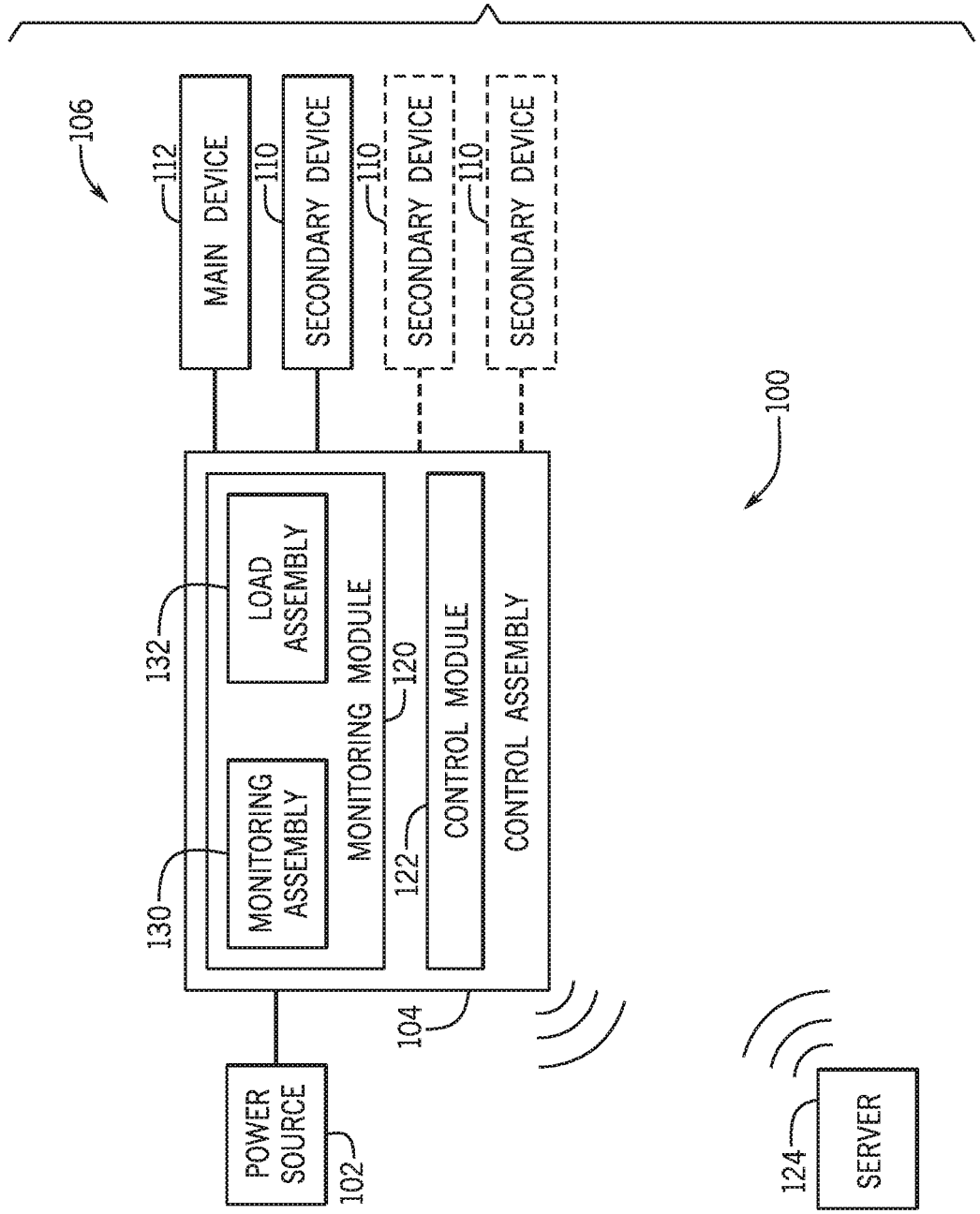
FIG. 1 is a schematic block diagram of a power control system, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Generally, embodiments of the present disclosure relate to devices and methods for use with refrigeration devices including temperature-stabilized or temperature-controlled storage containers. In an embodiment, performance data of a power source (e.g., a solar photovoltaic module array) is obtained to determine the power source's available power. Using the obtained data, the available power from the solar photovoltaic module array is quantified and prioritized to attached equipment or devices in real time. For example, in situations where available electrical power is insufficient to power all attached devices, the present disclosure provides various methods to "harvest" available power with increased efficiency. More specifically, available electrical power may be prioritized for use by a main device, such as a refrigeration device to cool and/or maintain a selected or suitable temperature range therein. Available power unused by the main device, if any, may be diverted to other devices to "harvest" the available power. Though some of the embodiments described herein relate to a refrigeration device, the present disclosure is not limited to refrigeration devices and systems as the methods and systems described below can be utilized with any type of attached equipment, including any type of health clinic equipment, among others.

Figure 2:
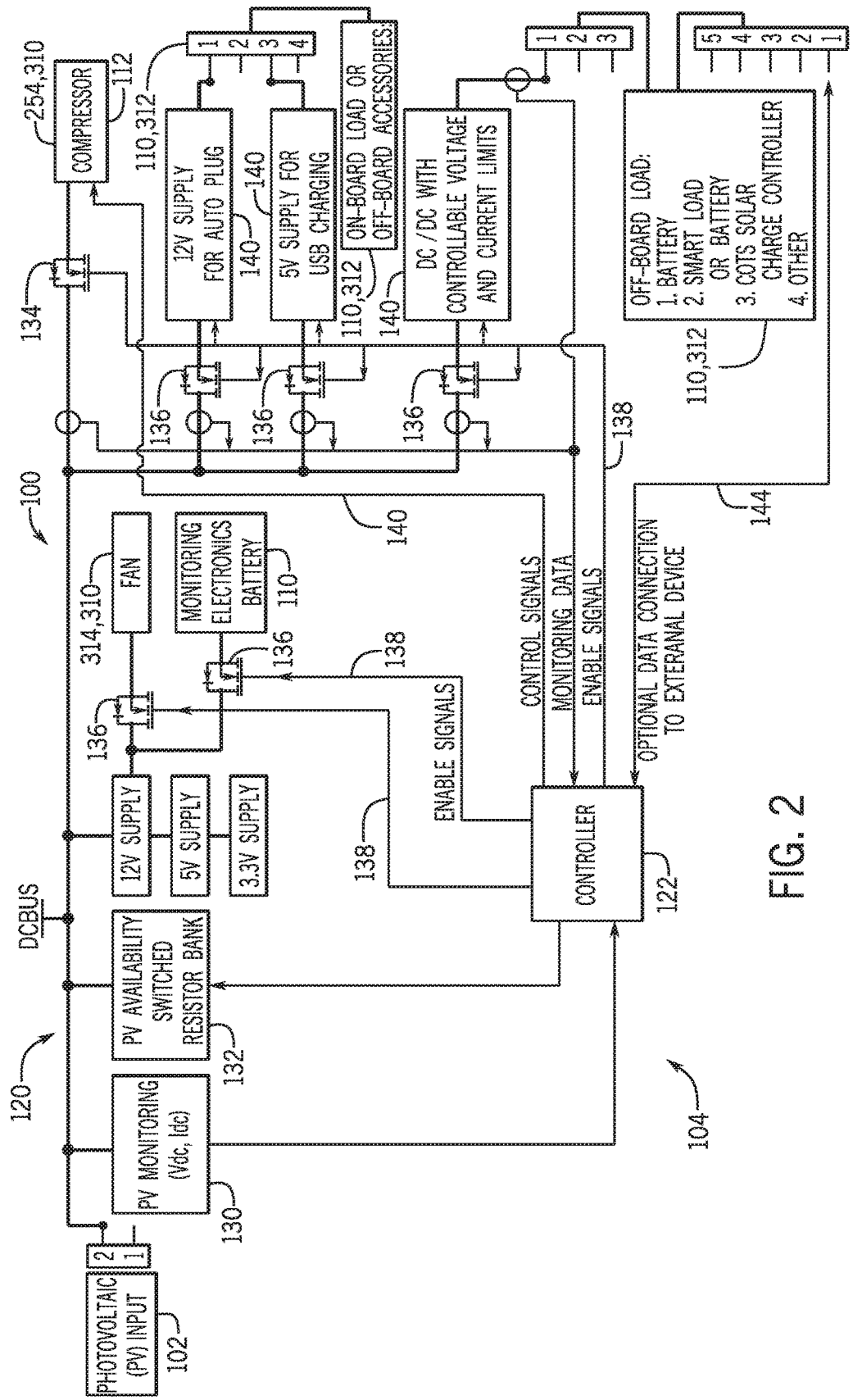
FIG. 2 is a simplified schematic of the power control system of FIG. 1.

FIG. 1 is a schematic block diagram of a power control system 100, according to an embodiment and FIG. 2 is a simplified block diagram of the power control system 100. Referring to FIGS. 1 and 2, the power control system 100 may include a power source 102, a control assembly 104, and one or more loads or devices 106 arranged to draw electrical power from the power source 102. The one or more devices 106 may be in electrical communication with the control assembly 104, either directly or indirectly. The control assembly 104 may also be in electrical communication with the power source 102. The electrical communication(s) may permit the one or more devices 106 to draw electrical power from the power source 102. In some embodiments, the electrical communication(s) may permit the various elements of the power control system 100 to share and transport information (e.g., data) between the various elements. For example, the control assembly 104 may receive data (such as available power and/or power usage, among others, as explained below) from the power source 102 and/or from the one or more devices 106 via the electrical communications between the various elements. The control assembly 104 may also transmit and/or receive data, instructions, or commands to or from the various elements connected thereto. For instance, the control assembly 104 may transmit data, instructions, and/or commands to the one or more devices 106 via the electrical communication between the control assembly 104 and the one or more devices 106, such as to cause the one or more devices 106 to begin operation, among others.

Figure 3:
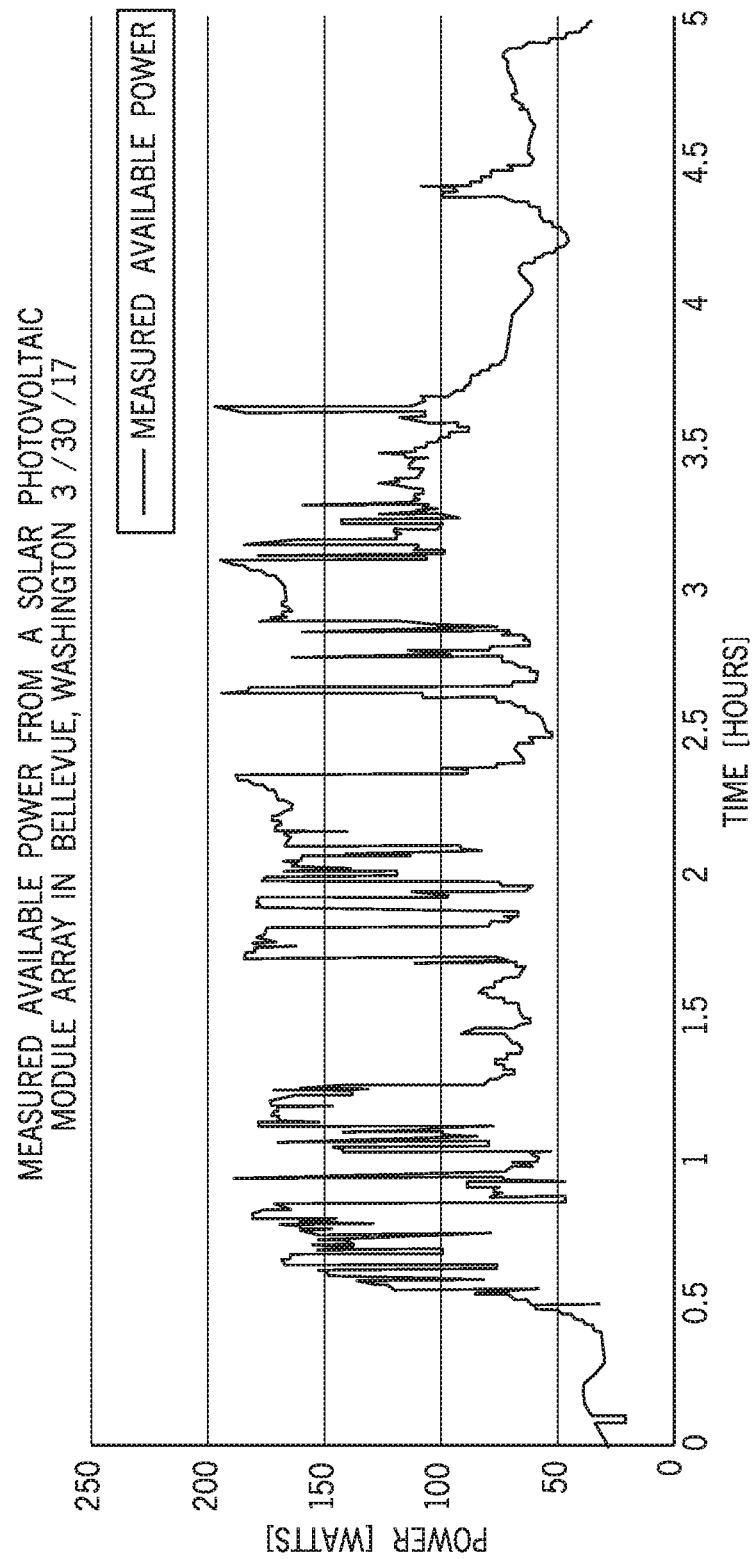
FIG. 3 illustrates measured available power from a solar photovoltaic module array test.

The power source 102 may be substantially any type of device or system operable to provide electrical power. For example, the power source 102 may be a battery, a solar photovoltaic module array, a dedicated AC current supply (such as from municipal or private facilities/electrical grids), or a generator, among others, or any combination thereof. Depending on the particular application, the electrical power available from the power source 102 may vary. For instance, the power source 102 may be unreliable and unsteady, such as in remote locations with unsophisticated or outdated electrical grids. In some embodiments, the available power may vary depending on weather conditions, the time of day, geography, seasons, etc. This is particularly applicable in embodiments where the power source 102 includes a solar photovoltaic module array. Consistent with current solar panel technology, the electrical power available from the solar photovoltaic module array necessarily varies with the intensity of light received by the solar photovoltaic module array. For instance, FIG. 3 illustrates measured available power from a test of a solar photovoltaic module array in Bellevue, Wash., on Mar. 30, 2017, which may be typical to available power curve of other solar photovoltaic module arrays in the same or other locations. As shown, the available power may vary from about 20 watts to about 200 watts on a typical day, with various undulations occurring throughout the day.

As explained more fully below, the power control system 100 (e.g., the control assembly 104) accounts for varying electrical power from the power source 102. For instance, the electrical power drawn by the one or more devices 106 may be modulated up or down based on the electrical power available from the power source 102. More particularly, the electrical power drawn by the one or more devices 106 may be modulated such that the total power drawn does not exceed the electrical power available from the power source 102. Additionally or alternatively, the power control system 100 (e.g., the control assembly 104) may "harvest" excess electrical power in times where available power exceeds a power requirement. For example, the power control system 100 (e.g., the control assembly 104) may direct excess power to one or more secondary devices 110 when the available power exceeds that used (or required) by a primary or main device 112, as explained below. The electrical power consumed by the one or more secondary devices 110 may be controlled at the secondary device(s) 110 (such as via direct communication with the one or more secondary devices 110) or may be controlled by dynamically modulating the voltage of the power supply in response to changes in both the "harvestable" available power and the impedance of the one or more secondary devices 110 to keep the power drawn by the one or more secondary devices 110 below what is calculated in real time to be harvestable. In this manner, the power control system 100 may utilize the available power with increased efficiency by limiting the amount of electrical power unused by any device.

Depending on the particular application, the power source 102 may be a centralized source of power located remotely from the control assembly 104 and/or from the one or more devices 106 (such as in standard municipal electrical grids), or the power source 102 may be associated directly with the control assembly 104 and/or with one of the devices 106. For example, the power source 102 (e.g., a solar photovoltaic module array, a battery, etc.) may be associated with at least one of the devices 106 (e.g., the main device 112) such that the power source 102 and the main device 112 may be considered one unit or device. In such embodiments, the power source 102 may power the main device 112 on a standalone basis, or in select combination with other devices 106 (such as with one or more secondary devices 110) connected thereto, as described below.

The control assembly 104 will now be discussed in more detail. The control assembly 104 monitors the available power from the power source 102 and modulates the electrical power drawn by or otherwise provided to the one or more loads or devices 106 based on the available electrical power. As shown in FIGS. 1 and 2, the control assembly 104 includes a monitoring module 120 and a control module 122. The monitoring module 120 measures the electrical power available from the power source 102. For instance, as explained below, the monitoring module 120 may continuously measure the available power by applying select loads to the power source 102 and measuring the resulting power characteristics (e.g., voltage, current, etc.) at the power source 102.

In some embodiments, the power control system 100 (e.g., the monitoring module 120) may monitor the performance of the power source 102 and/or the one or more devices 106. For example, as explained more fully below, the monitoring module 120 may monitor the power characteristics of the power source 102 at initial installation, on an ad hoc basis, or on an ongoing, continual basis. As such, the monitoring module 120 may be utilized to verify correct installation of the power source 102, to perform ad hoc diagnostic tests or procedures of the power source 102 and/or the one or more devices 106, or to continuously monitor performance of the power source 102 to detect, among others, damage to, theft of, or changing environmental conditions surrounding the power source 102, among others. Performance data of the power control system 100 may be stored, such as on a server 124, for analysis or monitoring. For example, the electrical power available from the power source 102 and the electrical power consumed by the one or more devices 106 may be logged and stored on the server 124, either remotely or onsite. In some embodiments, the data may be accessible to a user from a remote location. For example, the data may be stored on a remote server 124, the remote server 124 also being accessible to a user for data download/viewing. In this manner, the user can remotely access whether the power control system 100 is operating efficiently, at full capacity, or whether problems exist that warrant further on-site investigation.

Referring to FIGS. 1 and 2, the monitoring module 120 may include a monitoring assembly 130 and a load assembly 132. The monitoring assembly 130 may include any device or system capable of monitoring the power characteristics (e.g., voltage, current, etc.) at the power source 102. For example, the monitoring assembly 130 may include one or more electrical circuitry, devices, or microcontrollers configured to measure or meter voltage and current at the power source 102, either separately or simultaneously. For instance, the monitoring assembly 130 may include one or more analog-to-digital converters (ADCs) or sensing resistors designed for energy metering applications.

The load assembly 132 may be any device or system configured to briefly load the power source 102 for analysis or testing. For instance, the load assembly 132 may include a resistor bank comprised of a plurality of resistors placed across the power source 102 either individually or in combination with one another. In an embodiment, the load assembly 132 includes a set of varying resistors through which the power source 102 can be shunted through to create one or more artificial or test loads on the power source 102 to measure the voltage (and current) response of the power source 102. The load assembly 132 may be configured in any suitable configuration. For example, the load assembly 132 may include multiple (e.g., 6) different resistive loads in increasing resistance, such as by a factor of approximately 2. In an embodiment, the load assembly 132 includes a binary-weighted (or nearly so) array of six resistances, such as 2, 4, 8, 16, 33, and 66 ohms. In such embodiments, the load assembly 132 may provide 64 test load combinations, though the load assembly 132 may include more or less test load combinations depending on the particular application.

Figure 4:
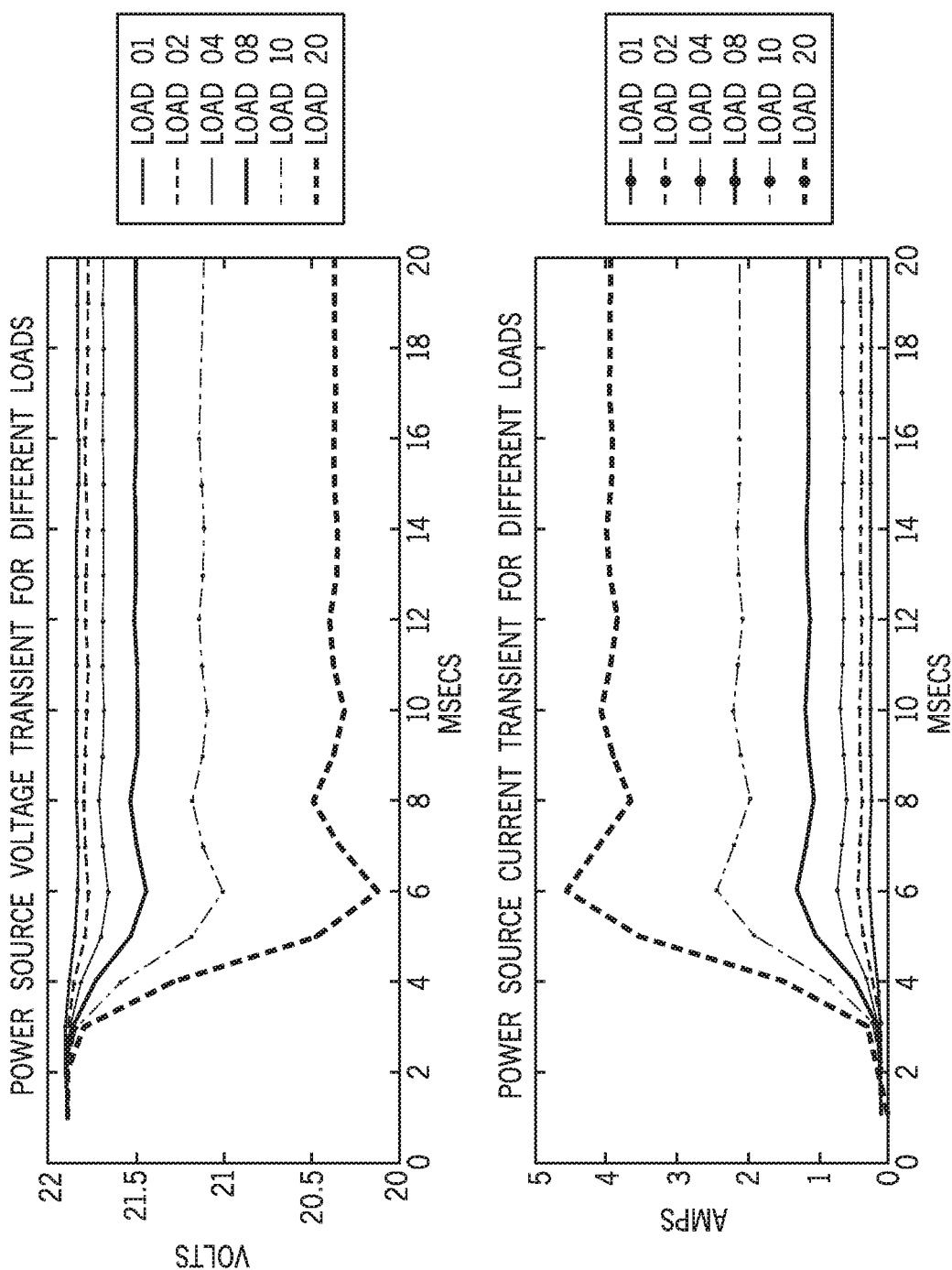

FIG. 4 illustrates an example plot of voltage and current at the power source 102 as individual test load combinations are turned on. To determine the available power of the power source 102, the monitoring module 120 can turn on any test load combination of the load assembly 132, such as by one or more field-effect transistors (FETs) controlled by a microcontroller. Once the power source 102 is loaded down by the load assembly 132, the monitoring assembly 130 measures the voltage and current at the power source 102. Depending on the particular application, the load assembly 132 may step through multiple test load combinations (either randomly or in a series of increasing or decreasing resistances) to build up a curve of available power versus voltage of the power source 102. For example, the load assembly 132 may apply increasing test loads on the power source 102 until the power consumption reaches a maximum value indicating the maximum instantaneous power available from the power source 102. In an embodiment, the load assembly 132 may not apply test loads past the point of maximum power so as to not pull the system voltage down to where it cannot sustain the various loads or devices 106. Depending on the particular application, the load assembly 132 may step through each test load combination (e.g., each of the possible 64 test load combinations) or may step through a select number of test load combinations. For instance, the load assembly 132 may step through each test load combination incrementing by one step each time, or may climb through the different test load combinations incrementing by greater than one step each time. In some embodiments, the load assembly 132 may start off at a load greater than the minimum to reduce the amount of test load combinations to step through.

In some embodiments, the monitoring module 120 may apply the load assembly 132 to the power source 102 over a period of time to ensure stabilization of voltage and current at each test load. For example, the monitoring module 120 may spend approximately 26 ms with each test load turned on with samples collected at 1 kHz, with a delay of about 70 ms between each test load setting of the load assembly 132, though other suitable configurations are contemplated. In some embodiments, it may take some time to stabilize each test load of the load assembly 132. For instance, depending on the particular load combination, it may take between about 4 ms and about 14 ms for the test load to stabilize. As such, in some embodiments, the monitoring assembly 130 may only sample voltage and current at the power source 102 during a latter part of each test load setting. For example, the monitoring assembly 130 may sample voltage and current at the power source 102 during the last 12-22 ms of each test load combination (e.g., during the last 16 ms of each test load combination on average).

The monitoring module 120 may continuously monitor the power available from the power source 102. As described herein, "continuously" includes situations where monitoring occurs without ceasing or where monitoring occurs intermittently, such as a defined number of times over a defined period of time. For instance, the monitoring module 120 may sample the available power every 10-20 seconds. In some embodiments, the monitoring module 120 may sample the available power more frequently or less frequently. For example, the monitoring module 120 may sample the available power more frequently when the power available from the power source 102 fluctuates more frequently. On the other hand, the monitoring module 120 may sample the available power less frequently when the power source 102 is relatively stable. The monitoring module 120 may also sample the available power less frequently to reduce overheating the monitoring module 120 (e.g., the load assembly 132) as well as to provide sufficient electrical power to the one or more devices 106.

Figure 5:
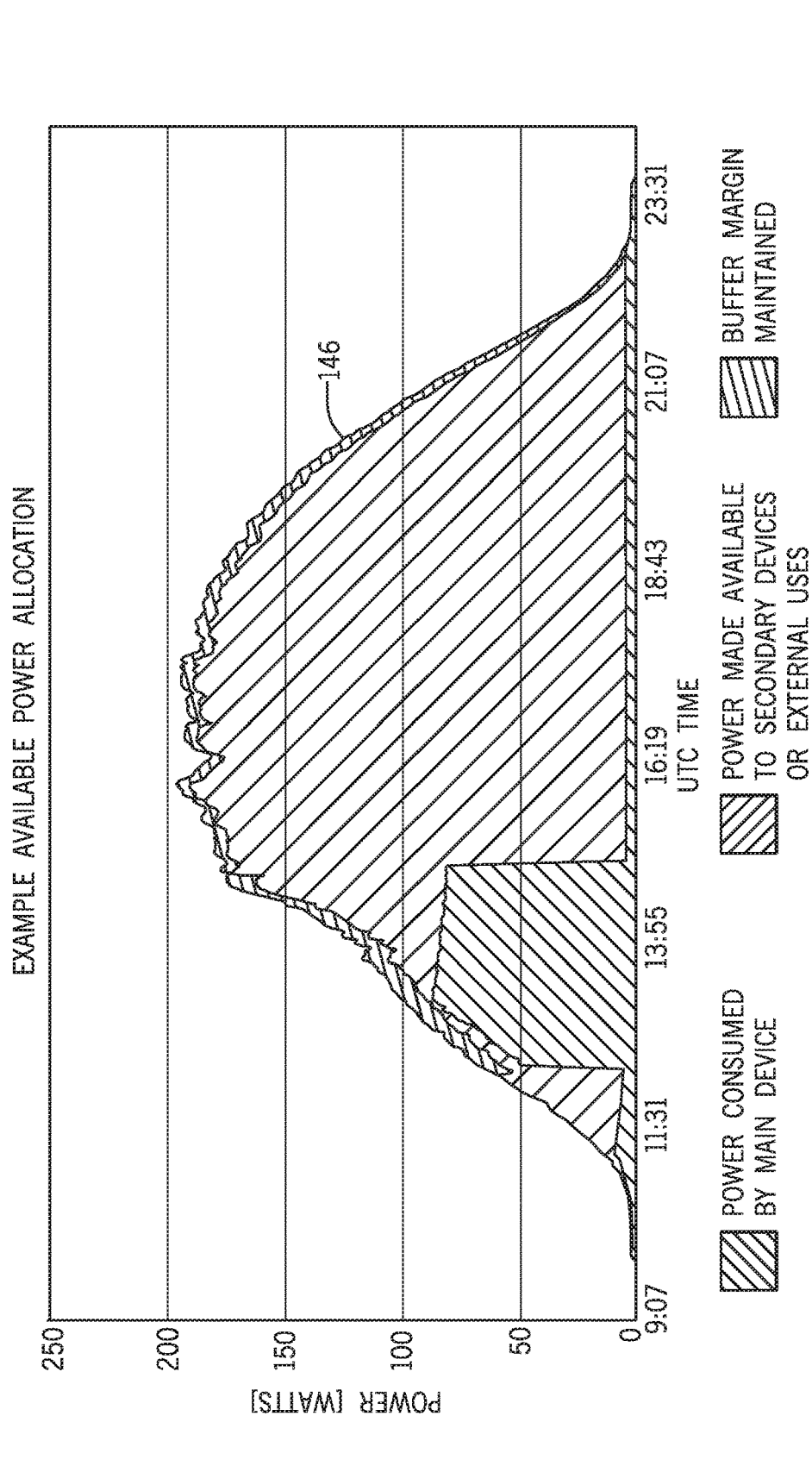
FIG. 5 is an example power allocation chart in relation to available power from a power source.

FIG. 5 is an example power allocation chart. Referring to FIGS. 2 and 5, the control module 122 selectively directs electrical power to the one or more devices 106 based on the available power (as determined by the monitoring module 120). For example, the control module 122 may select which devices 106 to turn on based on the power requirements of the one or more devices 106 in relation to the available power. For example, the control module 122 may direct power to the main device 112 once the available power exceeds a minimum power threshold to operate the main device 112. More specifically, as shown in FIG. 5, at any point in time, the available power may be less than that required by the main device 112, or at least less than that required to begin operating the main device 112. During such times, the control module 122 may limit power being directed to the main device 112 and/or may make power available to other devices 106 or external uses. Once the available power exceeds the power requirement of the main device 112, the control module 122 may direct electrical power to the main device 112.

Referring to FIG. 2, the control assembly 104 may include a plurality of electrical switches, such as transistors or other electrical circuitry, to selectively direct electrical power to the various devices 106 based on the available power. As shown in FIG. 2, an electrical switch may selectively interrupt or create electrical connection between the power source 102 and each device 106, such as a first switch 134 operable to selectively connect the main device 112 to the power source 102 and one or more second switches 136 operable to selectively connect the one or more secondary devices 110 with the power source 102. In such embodiments, the control assembly 104 includes corresponding signal paths, either wirelessly or otherwise, to selectively enable the first and second switches 134, 136. For example, as shown in FIG. 2, a plurality of enabling signal paths 138 may extend between the control module 122 and the first and second switches 134, 136 and along which the control module 122 sends control signals to the first and second switches 134, 136 to selectively direct electrical power to the main device 112 and/or to the one or more secondary devices 110, respectively. More specifically, once the available power exceeds the power requirement of the main device 112, the control module 122 may send one or more control signals via the enabling signal path 138 between the control module 122 and the first switch 134 to direct electrical power to the main device 112. To "harvest" electrical power unused by the main device 112, the control module 122 may send one or more control signals via the enabling signal paths 138 between the control module 122 and the one or more second switches 136 to direct electrical power to the secondary device(s) 110. Though FIG. 2 illustrates switches 136 to selectively interrupt or create electrical connection between the power source 102 and the one or more secondary devices 110, the control assembly 104 may include other suitable configurations. For instance, the control assembly 104 may include one or more integrated circuits 140 connected to each secondary device 110. In such embodiments, the control module 122 may send one or more control signals to the integrated circuits 140 (e.g., via the enabling signal paths 138) to control the amount of power directed to the secondary devices 110. For instance, the control module 122 may send one or more control signals to turn on the integrated circuits 140 that in turn begin pulse-width modulation switching of power transistors in the respective circuitry to control the amount of power being directed to each of the secondary devices 110.

With continued reference to FIGS. 2 and 5, once the main device 112 is drawing power from the power source 102, the control module 122 may modulate the power requirements of the main device 112 based on the available power. For instance, in embodiments where the electrical power available from the power source 102 fluctuates or varies, the control module 122 modulates (e.g., increases and decreases) the amount of electrical power drawn by the main device 112 such that the power drawn by the main device 112 does not exceed the power available. For example, as shown in FIG. 2, the control assembly 104 may include a control signal path 142, either wirelessly or otherwise, extending between the control module 122 and the main device 112 and along which the control module 122 sends control signals to the main device 112 to modulate the power drawn by the main device 112.

In some embodiments, the control module 122 may modulate the amount of electrical power drawn by the main device 112 to match the increases and decreases in available power. In such embodiments, the control module 122 may limit the main device 112 from drawing power exceeding the power available from the power source 102 while still keeping the main device 112 running, albeit at a reduced power consumption level. As shown in FIG. 5, a buffer margin 146 may be maintained between the power consumed by the main device 112 and the estimated instantaneous available power to limit the main device 112 from drawing unsustainable power from the power source 102 should the available power drop suddenly. The buffer margin 146 may be a constant value or may be adjusted (such as automatically) based on historic data or projections.

Unlike one or more embodiments of the present disclosure, some conventional control circuits ramp up the power drawn by an electrical device to a point that is not sustainable by the available power, at which point the electrical device is shut off completely. Additionally or alternatively, if the available power drops below a set power level (such as due to a cloud passing over a solar photovoltaic module array), some conventional control circuits shut off the electrical device completely rather than attempting to ramp down the power drawn by the device to keep the device running. In such conventional controls, the available power may still be more than the minimum power needed to operate the device, but the conventional controls needlessly shuts off the device.

In some embodiments, the control module 122 may be arranged to "harvest" the power unused by the main device 112. In one application, the control module 122 may direct available power unused by the main device 112 to the one or more secondary devices 110. For instance, the control module 122 may direct power to at least one secondary device when the main device 112 is not drawing power. Additionally, the control module 122 may direct excess power to at least one secondary device when the available power exceeds that being drawn by the main device 112, even when the main device 112 is operating at maximum load. In this way, the power control system 100 may be able to power more than one load at a time, such as the main device 112 and the one or more secondary devices 110. In another application, the control module 122 may direct electrical power to the one or more secondary devices 110 until the available power exceeds a minimum power threshold to operate the main device 112, whereupon the control module 122 diverts available power from the one or more secondary devices 110 and to the main device 112. In this manner, the control module 122 may prioritize available electrical power for the main device 112 while still harvesting unused available power.

In an embodiment, the control module 122 may also modulate the amount of power drawn by or provided to the one or more secondary devices 110 based on the available power. For instance, the control module 122 may modulate (e.g., increase or decrease) the amount of electrical power drawn by the one or more secondary devices 110 such that the power drawn by the one or more secondary devices 110, either alone or in combination with the main device 112, does not exceed the power available. For example, a data connection 144 may extend between the control module 122 and the one or more secondary devices 110, either wirelessly or otherwise. In such embodiments, the control module 122 may send one or more control signals to the one or more secondary devices 110 to modulate the amount of power drawn by the one or more secondary devices 110. Additionally, the control module 122 may control the voltage/current of the power provided to the one or more secondary devices 110 such that the one or more secondary devices 110 are not allowed to draw more power than what is dynamically calculated as "harvestable." For example, the one or more secondary devices 110 may operate within a range of power with the control module 122 controlling the amount of power directed to the one or more secondary devices 110 as power varies over time, such as via switches 136 or the integrated circuits 140.

Figure 6:
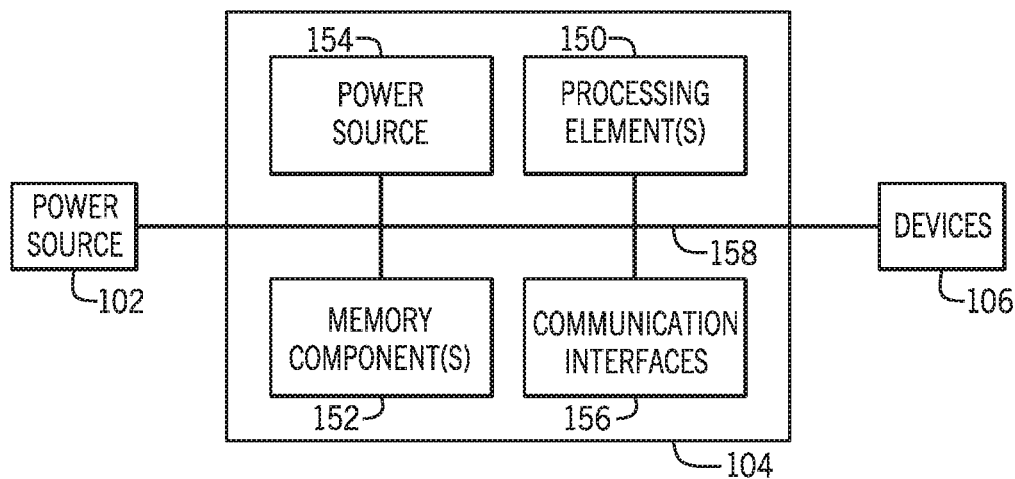
FIG. 6 is a simplified block diagram of a control assembly, according to an embodiment.

FIG. 6 is a simplified block diagram of the control assembly 104, according to an embodiment. Referring to FIG. 6, the control assembly 104 may include one or more devices or elements. For example, the control assembly 104 may include one or more processing electrical circuitry 150, one or more memory components 152, a power source 154, and one or more communication interfaces 156, etc. The components listed above are non-exhaustive and the control assembly 104 may also include other components typically found in computing systems and circuit assemblies, such as one or more sensors and one or more input/output interfaces. Each element of the control assembly 104 may in communication via one or more system buses 158 (see FIG. 2), wirelessly or the like. In some embodiments, the various elements of the control assembly 104 may be connected together via one or more printed circuit boards (PCBs). Each element of the control assembly 104 will be discussed in turn below.

The one or more processing electrical circuitry 150 may include substantially any type of electronic device capable of processing, receiving, and/or transmitting instructions. For example, the one or more processing electrical circuitry 150 may include a microprocessor or a microcontroller. Additionally, it should be noted that select components of the control assembly 104 may be controlled by a first processing element and other components may be controlled by a second processing element, where the first and second processing electrical circuitry 150 may or may not be in communication with each other. Additionally or alternatively, select acts may be performed by one component or element of the processing electrical circuitry with other steps performed by different processing electrical circuitry, where the different processing components or elements may or may not be in communication with each other.

The one or more memory components 152 store electronic data that is used by the control assembly 104 to store instructions for the processing element, as well as to store information or data concerning the performance of the power source 102 and/or the one or more devices 106. For example, the one or more memory components 152 may store data or content, such as, but not limited to, data files, audio files, video files, and so on, corresponding to various applications. The one or more memory components 152 may be magneto-optical storage, read only memory, random access memory, erasable programmable memory, flash memory, or a combination of one or more types of memory components or other memory electrical circuitry. The one or more memory components 152 may include instructions regarding priority or hierarchy of power needs. For example, when the power received from the power source 102 is insufficient to power all elements or components, the one or more processing electrical circuitry 150 can use the priority instructions to direct the control module 122 to provide power to elements or components indicated as having priority over other elements or components. For instance, the processor can give priority to providing power to the main device 112 over the one or more secondary devices 110.

The power source 154 provides power to the control assembly 104. Depending on the particular application, the power source 154 may be a battery, a power cord, or any other element configured to transmit electrical power to the components of the control assembly 104. The power source 154 may be different from the power source 102.

The one or more communication interfaces 156 provide communication to and from the control assembly 104, such as to or from the power source 102, a computing device (e.g., laptop, smartphone, tablet, etc.), the various components of the one or more devices 106, or any other device or system. The one or more communication interfaces 156 may operate via Wi-Fi, Ethernet, Bluetooth, or the like. In some embodiments, the one or more communication interfaces 156 may include one or more communication components, such as universal serial bus (USB) ports/cables or the like. Performance data of the power control system 100 may be transmitted, wirelessly or the like, to the server 124 via the one or more communication interfaces 156. The performance data may be transmitted to the server 124 directly from the one or more communication interfaces 156, or may be transmitted to the server 124 indirectly, such as via a separate computing device (e.g., a smartphone). In an embodiment, the performance data may be transmitted (such as via a cellular radio) to a cloud-based server 124 where it can be analyzed by a user.

In an embodiment, data and/or control signals may be sent to the control assembly 104 via the one or more communication interfaces 156. For example, information may be sent to the control assembly 104 for use in prioritizing available power to the various devices 106. More specifically, the control assembly 104 may be able to download weather data, among others, and use such information to better inform the power distribution algorithm. For instance, when sunny conditions are forecasted to last for a short duration of time, the control assembly 104 may prioritize power to the main device 112 for a longer period of time and/or at a lower power threshold or requirement to take advantage of the short sunny condition window. When sunny conditions are forecasted to last for a long duration of time, on the other hand, the control assembly 104 may prioritize power to the main device 112 for shorter periods of time and/or at a higher power threshold or requirement to harvest more power to the one or more secondary devices 110 knowing that sunny conditions are likely to continue.

The control assembly 104 may include various other components to provide a desired characteristic. For example, in an embodiment, the control assembly 104 may include integrated power protection electronics. In such embodiments, the circuit electronics of the control assembly 104 may protect the control assembly 104, the main device 112, the one or more secondary devices 110, or any combination thereof from electrical surges or from over/under voltages.

The one or more devices 106 will now be discussed in more detail. The main device 112 may be any device of primary or increased importance to which diversion of electrical power is a priority. For instance, the main device 112 may include a refrigeration device, a cell culture incubator, an oxygen concentrator device, or a medical testing machine, among others. For ease of reference, however, the following description relates to a refrigeration device. The concepts described below, however, may be applied to any type of main device.

Figure 7:
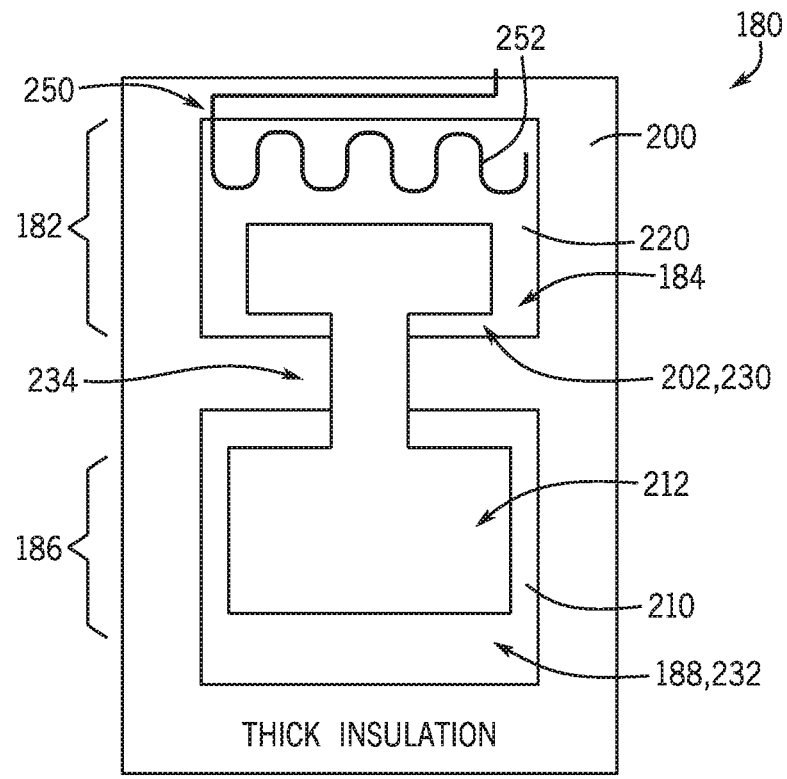
FIG. 7 is a cross-sectional view of a refrigeration device, according to an embodiment.

FIG. 7 is a cross-sectional view of a refrigeration device 180 for purposes of illustration according to an embodiment. Referring to FIG. 7, the power control system 100 may be associated with the refrigeration device 180. The refrigeration device 180 may be arranged in substantially any manner. For example, the refrigeration device 180 may be arranged similar to the devices disclosed in U.S. Pat. Nos. 9,366,483 B2; 9,435,578 B2; 9,523,522 B2; or 9,726,418 B2, the disclosures of which are hereby incorporated in their entireties, for all purposes. Referring to FIG. 7, the refrigeration device 180 may include an upper region 182 including a liquid-impermeable container 184 and a lower region 186 including a thermally-controlled storage region 188. The container 184 may be defined by one or more walls 200 including a first group of vapor-impermeable structures with a hollow interior 202. Similarly, the storage region 188 may be defined by one or more walls 210 including a second group of vapor-impermeable structures with a hollow interior 212. The container 184 may hold phase change material 220 (e.g., water, ice, etc.) therein to thermally control the temperature within the storage region 188, as explained below. For example, the one or more walls 200 defining the container 184 may include sealed edges as appropriate to maintain phase change material 220 within the container 184 during use of the refrigeration device 180.

The container 184 and the storage region 188 may be thermally connected to define a heat transfer system therebetween. For example, the hollow interior 202 of the container 184 may form a condenser 230. The hollow interior 212 of the storage region 188 may form an evaporator 232. In such embodiments, a connector 234 thermally connects the condenser 230 of the container 184 and the evaporator 232 of the storage region 188. The connector 234, which may be referred to as a thermosiphon, forms a liquid and vapor flow path between the hollow interior 202 of the container 184 and the hollow interior 212 of the storage region 188. For example, the connector 234 may allow passive heat exchange between the container 184 and the storage region 188 to cool the storage region 188 due to temperature gradients between the container 184 and the storage region 188. In an embodiment, the heat transfer between the container 184 and the storage region 188 may provide a relatively consistent 2-8° C. temperature within the storage region 188 even when ambient temperatures vary from 10-43° C. As explained below, the passive heat exchange provided by the connector 234 may provide selected or suitable temperatures within the storage region 188 even when electrical power is not available to the refrigeration device 180 for an extended period of time.

The container 184 and the storage region 188 may include substantially any shape. For example, the container 184 and the storage region 188 may include a rectangular, conical, or cylindrical structure, among others. In some embodiments, the container 184 and the storage region 188 may include the same internal shape, or may be shaped differently depending on thermal and size requirements or limitations. Additionally, the container 184 and the storage region 188 may be formed from substantially any material. For instance, the container 184 and the storage region 188 may be fabricated from plastic or metal material, among others. In some embodiments, the container 184 and the storage region 188 may be fabricated to include an anti-corrosion, an anti-galvanic, and/or an anti-ionization coating.

With continued reference to FIG. 7, the refrigeration device 180 includes an active refrigeration unit 250. The refrigeration unit 250 may include components routinely utilized in such systems, such as one or more sets of evaporation coils 252, a compressor 254 (see FIG. 2), etc. In an embodiment, the refrigeration unit 250 may be operable to freeze or otherwise cool a thermal battery to effectively cool the storage region 188 via the connector 234. For example, as shown in FIG. 7, the evaporation coils 252 may be positioned within the interior 202 of the container 184 to cool the phase change material 220 positioned therein. In an embodiment, the evaporation coils 252 may be operable to freeze the phase change material 220 within the container 184. In some embodiments, the refrigeration unit 250 may only require between about 1 hour and about 4 hours per day of electrical power to keep the phase change material 220 fully frozen. Keeping the phase change material 220 frozen within the container 184 cools the storage region 188 (and hence contents positioned within the storage region 188). More specifically, the passive heat exchange between the container 184 and the storage region 188 provided by the connector 234 allows the storage region 188 to access the "cool" stored in the frozen phase change material 220. In this manner, operation of the compressor 254 may be effectively decoupled from the cooling of the storage region 188 directly. For instance, the frozen phase change material 220 within the container 184 may effectively cool the storage region 188 when there is no power available to operate the refrigeration unit 250. In some embodiments, the frozen phase change material 220 may maintain selected or suitable temperatures within the storage region 188 for multiple day durations (e.g., 2 days, 3 days, 4 days, 5 days, etc.).

The phase change material 220 within the container 184 may be opportunistically frozen by a standard vapor compression refrigeration cycle whenever there is sufficient power available from the power source 102. For instance, electrical power may be diverted to the refrigeration device 180 when the power available from the power source 102 is sufficient to operate the refrigeration unit 250. To account for variations in available power, the compressor 254 of the refrigeration unit 250 may be a variable speed compressor that varies the speed of the unit based on a control signal from a controller (such as from the control module 122). For instance, the speed (e.g., RPM) of the compressor 254 may be varied (e.g., increased or decreased), such as via control signals sent along the control signal path 142, to modulate its power consumption in response to changes in available power. In this manner, the refrigeration unit 250 may be adjusted (e.g., ramped up or down) to draw as much power from the power source 102 as possible (without overshooting the instantaneous power available from the power source 102 and within the operating parameters of the refrigeration unit 250) while also keeping the compressor 254 running to cool the phase change material 220 within the container 184.

Figure 8:
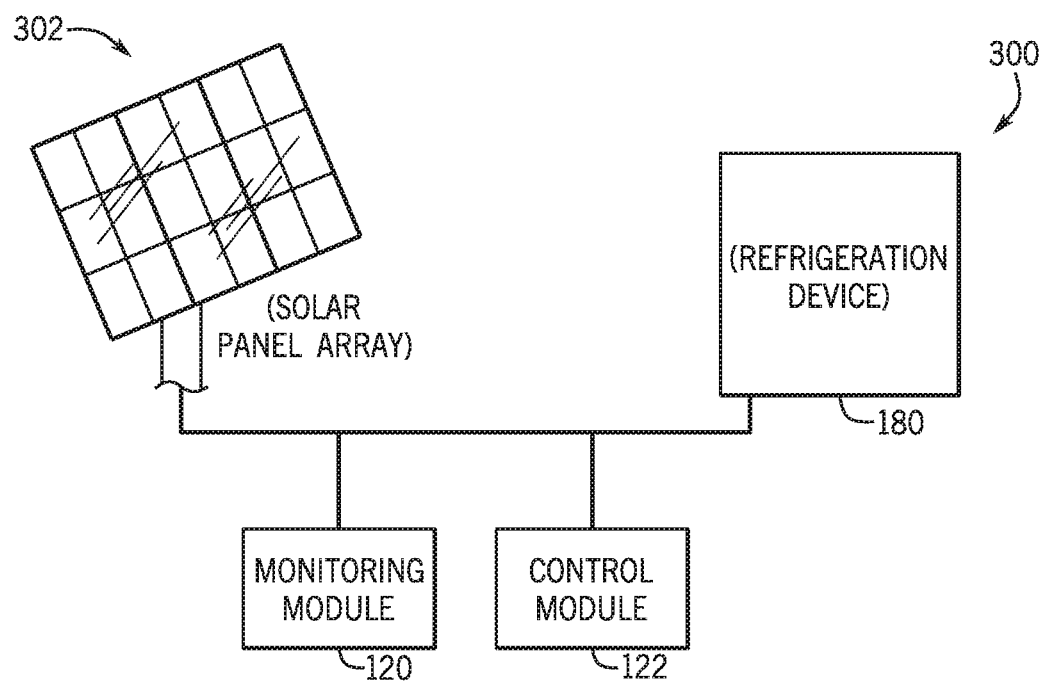
FIG. 8 is a schematic view of a refrigeration device assembly, according to an embodiment.

FIG. 8 is a schematic view of a refrigeration device assembly 300. Referring to FIG. 8, the refrigeration device 180 may be part of a refrigeration device assembly 300. As shown, the refrigeration device assembly 300 includes a solar photovoltaic module array 302, the refrigeration device 180 electrically coupled to the solar photovoltaic module array 302, the monitoring module 120, and the control module 122. The solar photovoltaic module array 302, which may be referred to simply as a solar panel array, may include any suitable configuration. For example, the solar photovoltaic module array 302 may be a single panel/module array or a multiple panel/module array to provide a desired amount of electrical power and/or satisfy size and space requirements, among others. Depending on the particular application, the refrigeration device 180, the monitoring module 120, and the control module 122 may be defined as a single unit, or the monitoring module 120 and/or the control module 122 may be separate from the refrigeration device 180. In like manner, the solar photovoltaic module array 302 may be formed as part of the refrigeration device 180, or may be separate from the refrigeration device 180. The control module 122 may modulate electrical power drawn by one or more loads from the solar photovoltaic module array 302, the control module 122 selecting which loads to turn on based on the power requirements of the one or more loads in relation to the available power.

Referring to FIG. 2, the one or more loads may include at least one internal load 310 and at least one external load 312. The at least one internal load 310 may be loads internal to the refrigeration device 180 itself, such as from the compressor 254, a fan 314, or the like. In like manner, the at least one external load 312 may be loads external to the refrigeration device 180, such as a battery charger, a power outlet, an attached freezer, or other accessories (either attached or otherwise). In such embodiments, the control assembly 104 (e.g., the control module 122) prioritizes available electrical power for the internal load(s) 310. For instance, the control module 122 may direct power to the internal load(s) 310 once the available power exceeds a minimum power threshold to operate the internal load(s) 310, such as to start the compressor 254 and/or to operate the fan 314 to cool various components of the refrigeration device 180 (e.g., the load assembly 132, the compressor 254, etc.). The control module 122 may also direct available power unused by the internal load(s) 310 to the external load(s) 312. For instance, the control module 122 may direct unused power to the external load(s) 312 to "harvest" the power available from the solar photovoltaic module array 302, as explained above. The external load(s) 312 may be activated if the voltage and current data obtained by the monitoring module 120 indicates that there is likely to be sufficient excess power.

Figure 9:
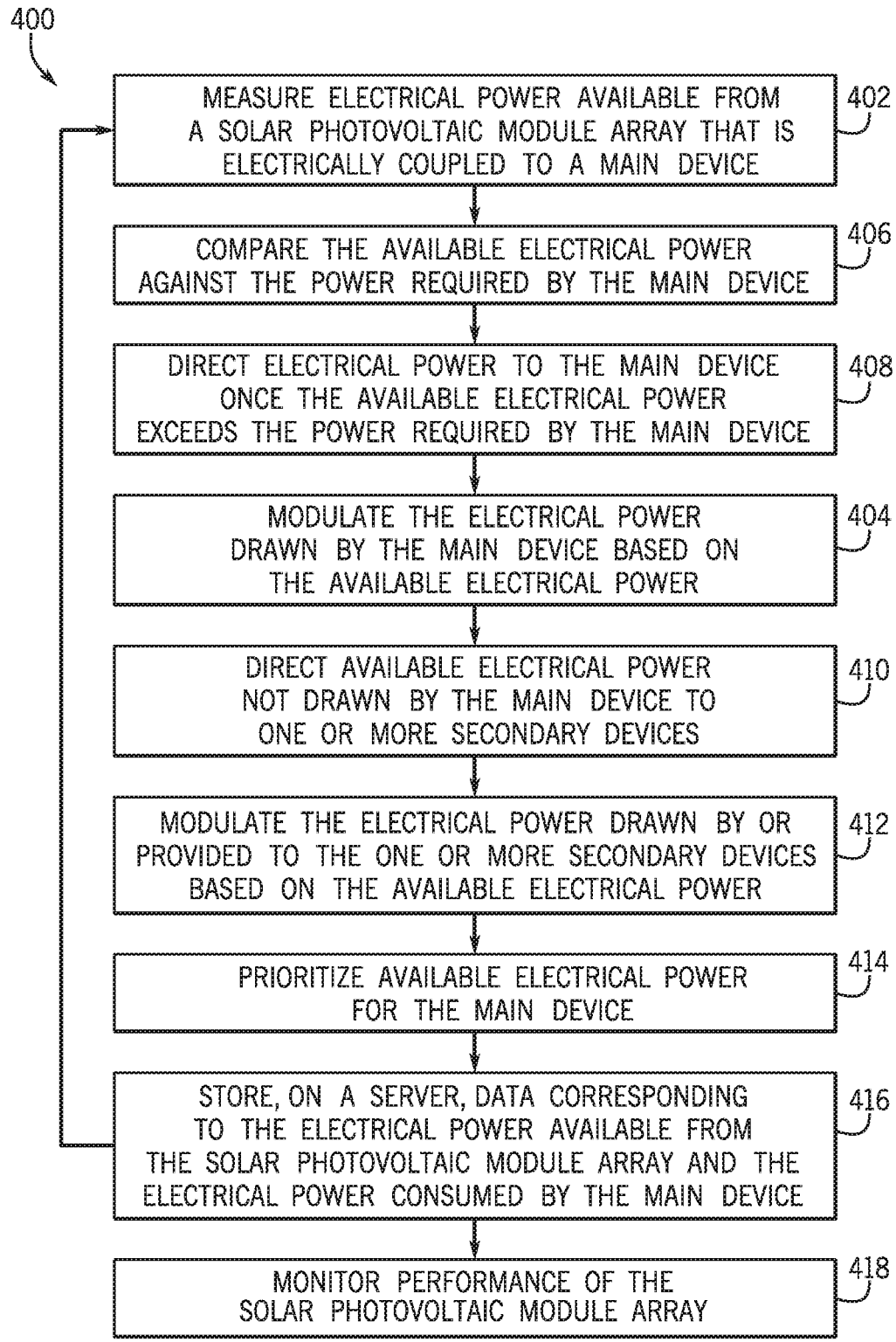
FIG. 9 is a flowchart illustrating a method of directing electrical power to one or more devices, according to an embodiment.

FIG. 9 is a flow chart illustrating a method 400 of directing electrical power to one or more devices 106, such as to the main device 112 and the one or more secondary devices 110, according to an embodiment. Referring to FIG. 9, the method 400 includes continuously measuring electrical power available from a solar photovoltaic module array 302 that is electrically coupled to the main device 112 (Block 402), and modulating the electrical power drawn by the main device 112 based on the available electrical power (Block 404). In some embodiments, the main device 112 may draw power directly from the solar photovoltaic module array 302. In some embodiments, modulating the electrical power drawn by the main device 112 may include increasing and decreasing the electrical power drawn by the main device 112 to match corresponding increases and decreases in available electrical power. For example, as the available power increases from the solar photovoltaic module array 302, the electrical power drawn by the main device 112 may increase correspondingly, or vice versa. In such embodiments, the electrical power drawn by the main device 112 may be modulated such that the power drawn by the main device 112 does not exceed the available power.

In some embodiments, the method 400 may include comparing the available electrical power against the power required by the main device 112 (Block 406). The method 400 may also include directing electrical power to the main device 112 once the available electrical power exceeds the power required by the main device 112 (Block 408). For example, once the available electrical power exceeds a minimum power threshold of the main device 112, electrical power may be directed from the solar photovoltaic module array 302 to the main device 112. Depending on the particular application, Blocks 406 and 408 may occur before modulating the electrical power drawn by the main device 112.

With continued reference to FIG. 9, the method 400 may include directing available electrical power not drawn by the main device 112 to one or more secondary devices 110 (Block 410). For example, excess power not used or required by the main device 112 may be directed to the one or more secondary devices 110, such as power not needed by the main device 112 for operation or power that is insufficient to operate the main device 112. The main device 112 may include a refrigeration device (e.g., refrigeration device 180), a cell culture incubator, an oxygen concentrator device, or a medical testing machine. The one or more secondary devices 110 may be separate from the main device 112. In an embodiment, the method 400 may include modulating the electrical power drawn by the one or more secondary devices 110 based on the available electrical power (Block 412). In another embodiment, the method 400 may include prioritizing available electrical power for the main device 112 (Block 414). For example, prioritizing available electrical power for the main device 112 may include directing available electrical power to the main device 112 at any time the available electrical power exceeds a power requirement of the main device 112, and diverting available electrical power unused by the main device 112 to the one or more secondary devices 110. In an embodiment, prioritizing available electrical power for the main device 112 may include distributing available electrical power to the main device or to the one or more secondary devices based on weather data downloaded to the control assembly 104.

Continuing to refer to FIG. 9, the method 400 may include storing, on a server 124, data corresponding to the electrical power available from the solar photovoltaic module array 302 and the electrical power consumed by the main device 112 (Block 416). In some embodiments, the data stored on the server 124 may be accessible to a user from a remote location. In some embodiments, the method 400 may include monitoring performance of the solar photovoltaic module array 302 (Block 418). For example, the solar photovoltaic module array 302 may be monitored just after installation (to verify correct installation) or on an ongoing basis (e.g., to access damage, theft, changing solar conditions of the solar photovoltaic module array 302, or continuously monitoring of the solar photovoltaic module array 302) using the data stored on the server 124, such as from a remote location.

Figure 10:
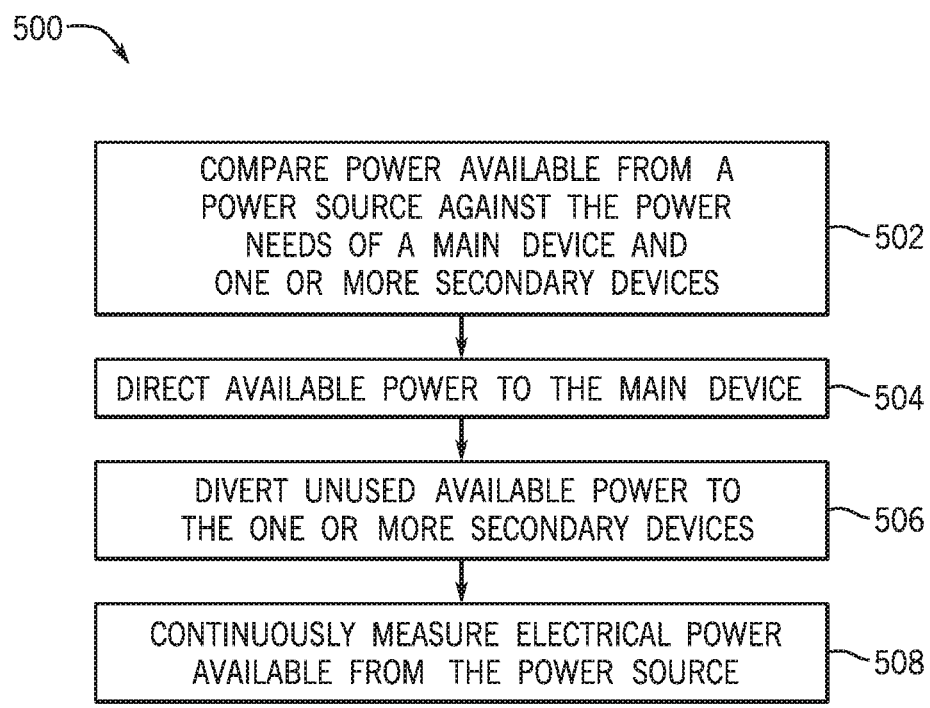
FIG. 10 is a flowchart illustrating a method of prioritizing power between a plurality of devices, according to an embodiment.

FIG. 10 is a flow chart illustrating a method 500 of prioritizing power between a plurality of devices 106, such as between the main device 112 and one or more secondary devices 110, according to an embodiment. Referring to FIG. 10, the method 500 includes comparing power available from the power source 102 against the power needs of the main device 112 and the one or more secondary devices 110 (Block 502), directing available power to the main device 112 (Block 504), and diverting unused available power to the one or more secondary devices 110 (Block 506). In some embodiments, the power source 102 includes a solar photovoltaic module array 302 electrically coupled to the main device 112. In some embodiments, directing available power to the main device 112 may include directing power to the main device 112 only when the available power exceeds a minimum power threshold to operate the main device 112. In some embodiments, diverting unused available power to the one or more secondary devices 110 may include diverting available power in excess of the power drawn by the main device 112 to the one or more secondary devices 110. In some embodiments, diverting unused available power to the one or more secondary devices 110 may include diverting available power to the one or more secondary devices 110 until the power available from the power source 102 exceeds the minimum power threshold to operate the main device 112, whereupon available power is diverted from the one or more secondary devices 110 and to the main device 112.

With continued reference to FIG. 10, the method 500 may include continuously measuring electrical power available from the power source 102 (Block 508). Continuously measuring the electrical power available from the power source 102 may include applying a test load to the power source 102, measuring the voltage and current across the test load, and computing power from the measured voltage and current.

The state of the art has progressed to the point where there is little distinction left between hardware, software (e.g., a high-level computer program serving as a hardware specification), and/or firmware implementations of aspects of systems; the use of hardware, software, and/or firmware is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software (e.g., a high-level computer program serving as a hardware specification), and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software (e.g., a high-level computer program serving as a hardware specification) implementation; or, yet again alternatively, the implementer may opt for some combination of hardware, software (e.g., a high-level computer program serving as a hardware specification), and/or firmware in one or more machines, compositions of matter, and articles of manufacture, limited to patentable subject matter under 35 U.S.C. § 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software (e.g., a high-level computer program serving as a hardware specification) or firmware, or of gate arrays or programmable hardware, such as by performing a reception of or a transmission of one or more instructions in relation to one or more operations described herein. Alternatively or additionally, in some variants, an implementation may include special-purpose hardware, software (e.g., a high-level computer program serving as a hardware specification), firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. The mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, the various aspects described herein which can be implemented, individually and/or collectively, by a wide range of hardware, software (e.g., a high-level computer program serving as a hardware specification), firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.), and/or electrical circuitry forming a communications device (e.g., a modem, communications switch, optical-electrical equipment, etc.). The subject matter described herein may be implemented in an analog or digital fashion or some combination thereof.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

The herein described components (e.g., operations), devices, objects, and the discussion accompanying them are used as examples for the sake of conceptual clarity and that various configuration modifications are contemplated. Consequently, as used herein, the specific 745 exemplars set forth and the accompanying discussion are intended to be representative of their more general classes. In general, use of any specific exemplar is intended to be representative of its class, and the non-inclusion of specific components (e.g., operations), devices, and objects should not be taken limiting.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of directing electrical power to one or more devices, the method comprising:
   continuously measuring available electrical power that is available from a solar photovoltaic module array that is electrically coupled to a main device;
   modulating electrical power drawn by the main device based on the available electrical power; and
   maintaining a buffer margin between the electrical power drawn by the main device and the available electrical power.

2. The method of claim 1, further comprising:
   comparing the available electrical power against power required by the main device; and
   directing electrical power to the main device once the available electrical power exceeds the power required by the main device.

3. The method of claim 1, wherein modulating the electrical power drawn by the main device includes increasing and decreasing the electrical power drawn by the main device to match corresponding increases and decreases in the available electrical power.

4. The method of claim 3, wherein the electrical power drawn by the main device is modulated such that the electrical power drawn by the main device does not exceed the available power.

5. The method of claim 1, further comprising directing at least a portion of the available electrical power not drawn by the main device to one or more secondary devices.

6. The method of claim 5, further comprising modulating the at least a portion of the electrical power drawn by or provided to the one or more secondary devices based on the available electrical power.

7. The method of claim 5, further comprising prioritizing the available electrical power for the main device.

8. The method of claim 7, wherein prioritizing the available electrical power for the main device includes:
   directing at least a portion of the available electrical power to the main device at any time the available electrical power exceeds a power requirement of the main device; and
   diverting at least a portion of the available electrical power unused by the main device to the one or more secondary devices.

9. The method of claim 7, wherein prioritizing the available electrical power for the main device includes distributing the available electrical power to the main device or to the one or more secondary devices based on weather data downloaded to a control assembly.

10. The method of claim 5, wherein:
    the main device includes a refrigeration device, a cell culture incubator, an oxygen concentrator device, or a medical testing machine; and
    the one or more secondary devices are separate from the main device.

11. The method of claim 1, further comprising storing, on a server, data corresponding to the electrical power available from the solar photovoltaic module array and the electrical power consumed by the main device.

12. The method of claim 11, wherein the data stored on the server is accessible to a user from a remote location.

13. The method of claim 1, wherein the main device draws power directly from the solar photovoltaic module array, the solar photovoltaic module array attached to the main device.

14. The method of claim 1, further comprising monitoring performance of the solar photovoltaic module array.

15. The method of claim 14, wherein:
    monitoring the performance of the solar photovoltaic module array includes sampling the electrical power available from the solar photovoltaic module array a defined number of times over a defined period of time; and
    maintaining a buffer margin between the electrical power drawn by the main device and the available electrical power includes adjusting the buffer margin based on the electrical power available sampled from the solar photovoltaic module array.

16. A method of prioritizing power between a plurality of devices, the method comprising:
    comparing available power from a power source against power needs of a main device and one or more secondary devices, wherein the power source includes a solar photovoltaic module array electrically coupled to the main device;
    directing a portion of the available power to the main device;
    diverting an unused portion of the available power to the one or more secondary devices; and
    maintaining a buffer margin between (1) the available power and (2) the portion of the available power directed to the main device and the unused portion of the available power diverted to the one or more secondary devices.

17. The method of claim 16, wherein:
    directing a portion of the available power to the main device includes directing the portion of the available power to the main device only when the available power exceeds a minimum power threshold to operate the main device; and
    diverting an unused portion of the available power to the one or more secondary devices includes diverting the unused portion of the available power that is in excess of the portion of the available power directed to the main device to the one or more secondary devices.

18. The method of claim 17, wherein diverting the unused portion of the available power to the one or more secondary devices includes diverting the unused portion of the available power to the one or more secondary devices until the available power from the power source exceeds the minimum power threshold to operate the main device, whereupon the available power is diverted from the one or more secondary devices and to the main device.

19. The method of claim 16, further comprising continuously measuring the available power from the power source.

20. The method of claim 19, wherein continuously measuring available power from the power source includes:
    applying a test load to the power source;
    measuring the voltage and current across the test load; and
    computing power from the measured voltage and current.

21. A control assembly configured to modulate electrical power drawn by one or more devices based on available power, the control assembly comprising:
a monitoring module configured to continuously measure available electrical power that is available from a power source; and
a control module configured to
selectively direct electrical power to the one or more devices based on the available electrical power, the control module selecting which loads to turn on based on power requirements of the one or more devices in relation to the available electrical power; and
maintain a buffer margin between the electrical power directed to the one or more devices and the available electrical power.

22. The control assembly of claim 21, wherein the control module directs the electrical power to a main device once the available electrical power exceeds a minimum power threshold to operate the main device.

23. The control assembly of claim 22, wherein the control module directs a portion of the available electrical power unused by the main device to one or more secondary devices.

24. The control assembly of claim 23, wherein:
the main device is a refrigeration device;
the power source includes a solar photovoltaic module array attached to the refrigeration device; and
the one or more secondary devices are separate from the refrigeration device.

25. The control assembly of claim 22, wherein the control module modulates the power requirements of the main device based on the available electrical power.

26. The control assembly of claim 21, wherein the control module directs the available electrical power to one or more secondary devices until the available electrical power exceeds a minimum power threshold to operate the main device, whereupon the control module diverts the available electrical power from the one or more secondary devices and to the main device.

27. A refrigeration device assembly, comprising:
a solar photovoltaic module array;
a refrigeration device electrically coupled to the solar photovoltaic module array;
a monitoring module configured to continuously measure available electrical power that is available from the solar photovoltaic module array; and
a control module configured to
modulate electrical power drawn by one or more loads from the solar photovoltaic module array based on the available electrical power, the control module selecting which loads to turn on based on power requirements of the one or more loads in relation to the available electrical power; and
maintain a buffer margin between the electrical power drawn by the one or more loads and the available electrical power.

28. The refrigeration device assembly of claim 27, wherein the one or more loads includes at least one internal load and at least one external load.

29. The refrigeration device assembly of claim 28, wherein the at least one internal load includes a compressor and a fan.

30. The refrigeration device assembly of claim 29, wherein the at least one external load includes a battery charger.

31. The refrigeration device assembly of claim 28, wherein the control module directs at least a portion of the available electrical power to the at least one internal load once the available electrical power exceeds a minimum power threshold to operate the at least one internal load.

32. The refrigeration device assembly of claim 31, wherein:
the control module directs at least a portion of the available electrical power that is unused by the at least one internal load to the at least one external load; and
the solar photovoltaic module array is attached to the refrigeration device.

* * * * *